United States Patent [19]
Jonas et al.

[11] Patent Number: 6,019,035
[45] Date of Patent: Feb. 1, 2000

[54] FOOD SMOKER

[76] Inventors: James E. Jonas; Vicki Jonas, both of 338 NW. 76th St., Seattle, Wash. 98117

[21] Appl. No.: 09/234,667

[22] Filed: Jan. 21, 1999

[51] Int. Cl.[7] .................................. A23L 1/01; A23B 4/04
[52] U.S. Cl. ........................... 99/482; 99/467; 126/25 R; 126/59.5
[58] Field of Search .......................... 99/467, 481–483, 99/340, 446, 399, 516, 480; 426/235, 314, 315; 126/25 R, 25 A, 59.5, 79; 131/329, 330, 185, 200; 110/108, 102, 118, 196; 206/525, 524.6

[56] References Cited

U.S. PATENT DOCUMENTS

| | | |
|---|---|---|
| 2,967,023 | 1/1961 | Huckabee ........................ 99/482 X |
| 2,984,171 | 5/1961 | Lee, Sr. ........................... 99/482 X |
| 3,078,783 | 2/1963 | Lee, Sr. ........................... 99/352 |
| 3,788,301 | 1/1974 | Terry .............................. 126/59.5 |
| 4,374,489 | 2/1983 | Robbins .......................... 99/482 |
| 4,436,100 | 3/1984 | Green, Jr. ........................ 131/330 |
| 4,779,525 | 10/1988 | Gaines ........................... 99/467 X |
| 5,048,406 | 9/1991 | Cofer ............................ 206/525 X |
| 5,193,445 | 3/1993 | Ferguson ........................ 99/482 |

*Primary Examiner*—Timothy Simone

[57] ABSTRACT

A food smoker for providing a smoky flavor to food. The food smoker includes an elongate cylinder having opposed open ends and an interior adapted for receiving wood chips. The cylinder has a plurality of rows of generally equally spaced apertures extending through it. The apertures are positioned in an upper ⅓ portion of the cylinder. A pair of end caps are detachably coupled to the ends of the cylinder.

19 Claims, 3 Drawing Sheets

FOOD SMOKER

BACKGROUND OF THE INVENTION

1. Field of the Invention

The present invention relates to smoke generating devices and more particularly pertains to a new food smoker for providing a smoky flavor to food.

2. Description of the Prior Art

The use of smoke generating devices is known in the prior art. More specifically, smoke generating devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,193,445; U.S. Pat. No. Des. 375,020; U.S. Pat. No. 4,779,525; U.S. Pat. No. 4,374,489; U.S. Pat. No. 2,967,023; and U.S. Pat. No. 5,048,406.

While these devices fulfill their respective, particular objectives and requirements, the aforementioned patents do not disclose a new food smoker. The inventive device includes an elongate cylinder having opposed open ends and an interior adapted for receiving wood chips. The cylinder has a plurality of rows of generally equally spaced apertures extending through it. The apertures are positioned in an upper ⅓ portion of the cylinder. A pair of end caps are detachably coupled to the ends of the cylinder.

In these respects, the food smoker according to the present invention substantially departs from the conventional concepts and designs of the prior art, and in so doing provides an apparatus primarily developed for the purpose of providing a smoky flavor to food.

SUMMARY OF THE INVENTION

In view of the foregoing disadvantages inherent in the known types of smoke generating devices now present in the prior art, the present invention provides a new food smoker construction wherein the same can be utilized for providing a smoky flavor to food.

The general purpose of the present invention, which will be described subsequently in greater detail, is to provide a new food smoker apparatus and method which has many of the advantages of the smoke generating devices mentioned heretofore and many novel features that result in a new food smoker which is not anticipated, rendered obvious, suggested, or even implied by any of the prior art smoke generating devices, either alone or in any combination thereof.

To attain this, the present invention generally comprises an elongate cylinder having opposed open ends and an interior adapted for receiving wood chips. The cylinder has a plurality of rows of generally equally spaced apertures extending through it. The apertures are positioned in an upper ⅓ portion of the cylinder. A pair of end caps are detachably coupled to the ends of the cylinder.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new food smoker apparatus and method which has many of the advantages of the smoke generating devices mentioned heretofore and many novel features that result in a new food smoker which is not anticipated, rendered obvious, suggested, or even implied by any of the prior art smoke generating devices, either alone or in any combination thereof.

It is another object of the present invention to provide a new food smoker which may be easily and efficiently manufactured and marketed.

It is a further object of the present invention to provide a new food smoker which is of a durable and reliable construction.

An even further object of the present invention is to provide a new food smoker which is susceptible of a low cost of manufacture with regard to both materials and labor, and which accordingly is then susceptible of low prices of sale to the consuming public, thereby making such food smoker economically available to the buying public.

Still yet another object of the present invention is to provide a new food smoker which provides in the apparatuses and methods of the prior art some of the advantages thereof, while simultaneously overcoming some of the disadvantages normally associated therewith.

Still another object of the present invention is to provide a new food smoker for providing a smoky flavor to food.

Yet another object of the present invention is to provide a new food smoker which includes an elongate cylinder having opposed open ends and an interior adapted for receiving wood chips. The cylinder has a plurality of rows of generally equally spaced apertures extending through it. The apertures are positioned in an upper ⅓ portion of the cylinder. A pair of end caps are detachably coupled to the ends of the cylinder.

Still yet another object of the present invention is to provide a new food smoker that saves chips by providing controlled burning for slower chip consumption and avoidance of fire. Thus the chips smolder rather than burning up quickly.

Even still another object of the present invention is to provide a new food smoker that has hanging loops for hanging the food smoker from the lid of a grill so that the smoke doesn't rise directly over the food on the grates of the grill.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
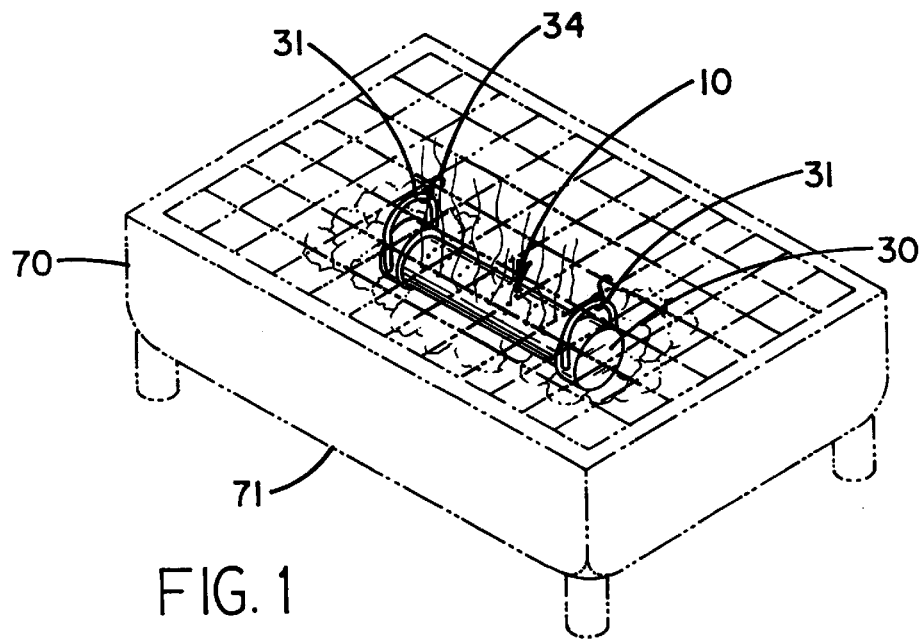
FIG. 1 is a schematic perspective view of a new food smoker in use according to the present invention.
Figure 2:
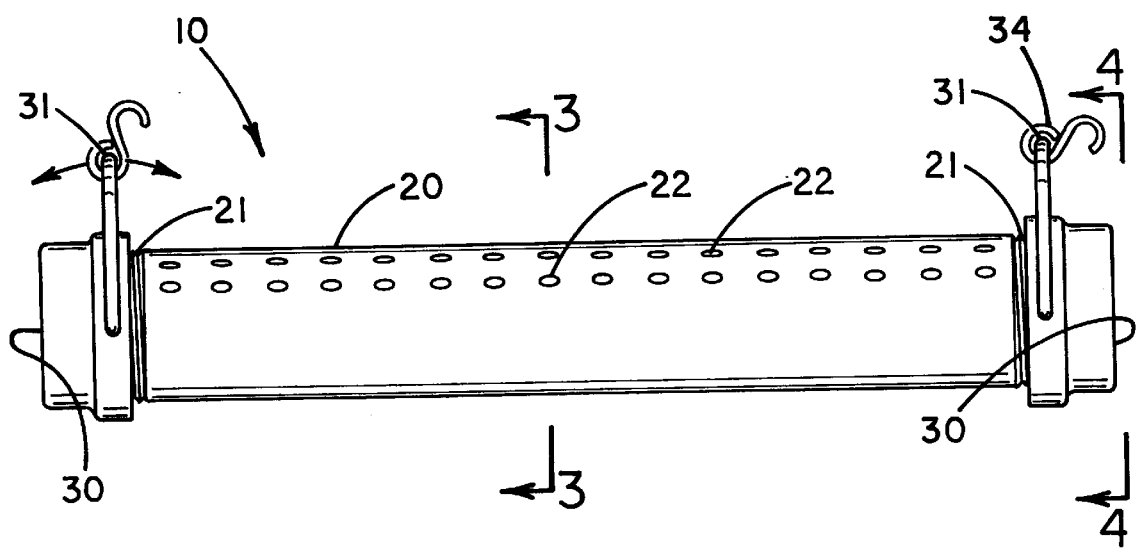
FIG. 2 is a schematic side view of the present invention.

With reference now to the drawings, and in particular to FIGS. 1 through 5 thereof, a new food smoker embodying the principles and concepts of the present invention and generally designated by the reference numeral 10 will be described.

As best illustrated in FIGS. 1 through 5 the food smoker 10 generally comprises an elongate cylinder 20 having opposed open ends 21 and an interior adapted for receiving wood chips (not shown). The cylinder 20 has a plurality of apertures 22 extending through it. The apertures 22 are positioned in an upper ⅓ portion of the cylinder 20. A pair of end caps 30 are detachably coupled to the ends 21 of the cylinder 20.

In more detail, the preferred length of the cylinder 20 between the ends 21 is between about 6 and 24 inches long and is ideally 12 inches long. The preferred outer diameter of the cylinder 20 is between about ¾ and 3 inches, and ideally 1½ inch.

Figure 3:
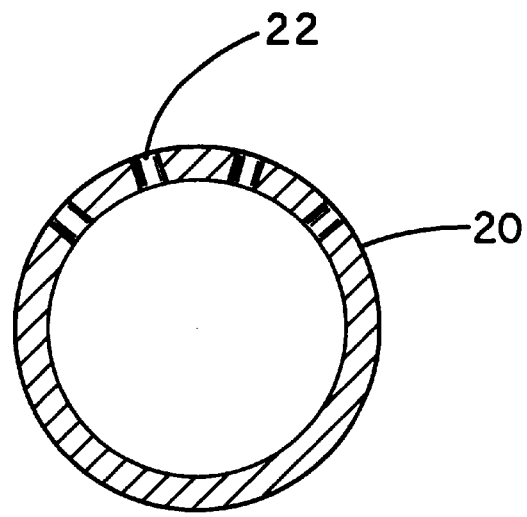
FIG. 3 is a schematic cross sectional view of the present invention taken from Line 3—3 of FIG. 2.

As best shown in FIG. 3, the plurality of apertures 22 are positioned in an upper ⅓ portion of the cylinder 20 so that the hot air that is rising from the heat source doesn't flow into the apertures 22 as quickly, thereby slowing the burning of the wood chips.

Preferably, the plurality of apertures 22 are arranged in four spaced apart generally straight rows. Ideally, the distance between the rows is substantially uniform along the respective lengths. Also ideally, adjacent apertures 22 in each of the rows are spaced apart at substantially equal intervals. The intervals between the apertures 22 in each of the rows are substantially equal to the intervals between the apertures 22 in the other rows. More ideally, the distance between the rows is between about ¹⁄₁₆ inch and ½ inch, most ideally ⅛ inch. The distance between the apertures 22 in each particular row is between about ¼ and ¾ inch, most ideally ½ inch.

Preferably, the open ends 21 of the cylinder 20 are outwardly threaded. The pair of threaded end caps 30 are threadedly coupled to the ends 21 of the cylinder 20.

Figure 4:
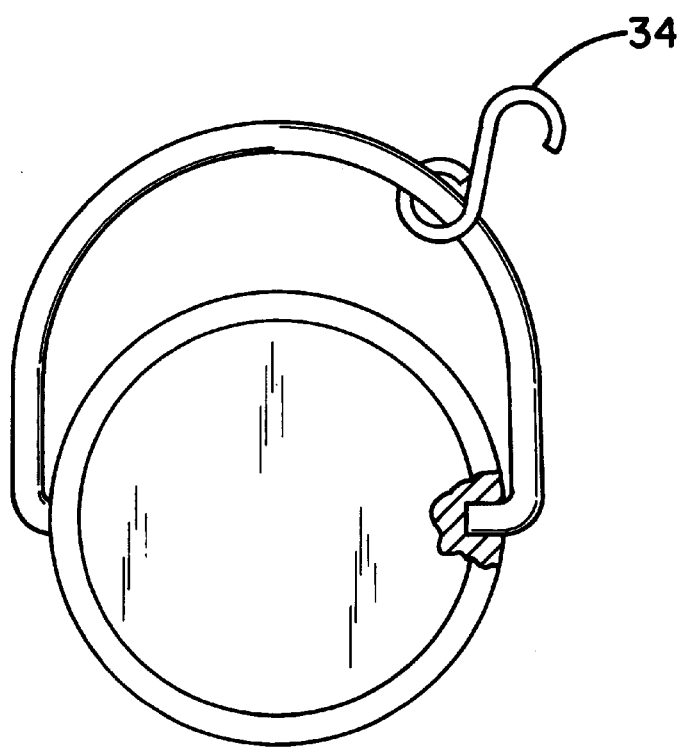
FIG. 4 is a schematic end view of the present invention taken from Line 4—4 of FIG. 2.
Figure 5:
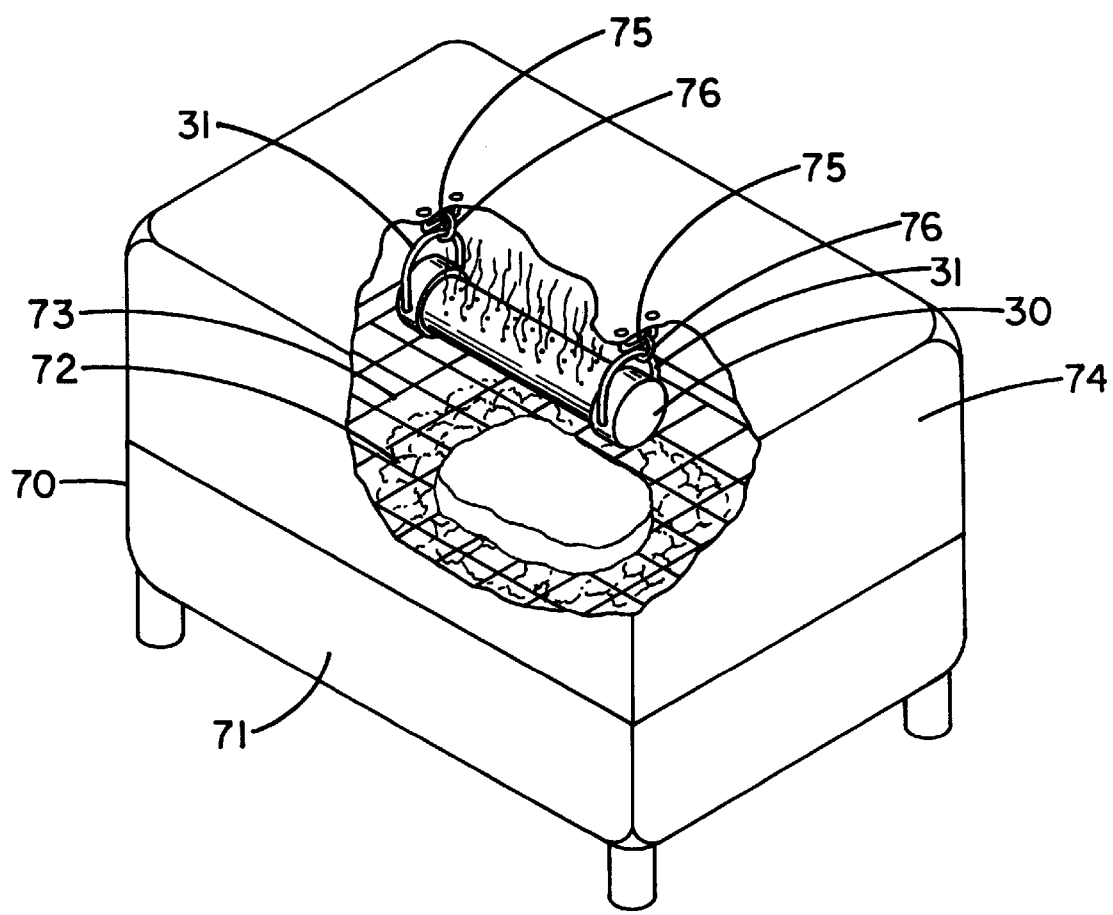
FIG. 5 is a schematic perspective view of a food smoking system according to the present invention.

Also preferably, as best shown in FIGS. 4 and 5, each of the end caps 30 has an arcuate hanging loop 31 pivotally coupled thereto for suspending the cylinder 20 above a heat source of the grill 70. The cylinder 20 may be suspended either from the grates 73 of a grill 70, or it may be suspended from the lid 74 of a grill 70 so that the smoke doesn't rise directly over the food on the grate 73s of the grill 70, but rather is carried in smaller quantities to the food from above by air flow within the grill 70. Suspension of the cylinder 20 permits a user to control the amount of smoky flavor through positioning of the cylinder 20 to control the speed of burning rather than changing the amount of heat by using less coals or turning down the flame on a gas grill 70. This is particularly advantageous where a very high heat is required for a particular kind of cooking, such as searing meat.

Ideally, as shown in FIG. 4, each of the end caps 30 has a pair of opposed apertures 32 that extend inwardly of an outer periphery thereof. Each of the hanging loops 31 have opposed L-shaped ends 33 that are inserted in the apertures 32 of the end caps 30.

Optionally, each of the hanging loops 31 of the end caps 30 may have a hook 34 coupled to it. As best shown in FIG. 4, each hook 34 has a loop portion 35 wrapped around the associated hanging loop 31 and a J-shaped portion 36 extending from the loop portion 35. The J-shaped portion 36 is adapted to hook onto a rack or grate of a grill.

In use, one of the end caps 30 is removed and wood chips are placed in the cylinder 20. The end cap is replaced. The food smoker 10 may be placed directly on the heat source, suspended from the grate 73, or suspended from the lid 74 above the grate, depending on the amount of smoke desired. The heat from the heat source causes the wood chips to smolder, thereby producing smoke. Food is placed on the grill and cooked. The smoke from the food smoker 10 penetrates the food, giving the food a pleasant, smoky flavor.

As shown in FIG. 5, the food smoker 10 may also be combined with a grill 70, a plurality of wood chips (not shown), and a line 76 to form a food smoking system. In such an embodiment, the grill 70 comprises a lower housing 71 for holding flammable material 72 therein, a grate 73 disposed on the lower housing 71, and a lid 74 covering the housing. The lid 74 has a pair of U-shaped hangers 75 that downwardly extend therefrom. The line 76 may extend between the hangers 75 of the lid 74 of the grill 70 and the hanging loops 31 of the end caps 30 for suspending the cylinder 20 from the lid 74, or the line 76 may extend between the grate 73 and the hanging loops 31 of the end caps 30 for suspending the cylinder 20 from the grate 73. Preferably, the line 76 is nonflammable. Alternatively, the hooks 34 may be hooked onto the hangers 75 of the lid 74 of the grill 70.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A food smoker for providing a smoky flavor to food, comprising:
   an elongate cylinder having opposed open ends, said cylinder having an interior adapted for receiving wood chips;
   said cylinder having a plurality of apertures extending therethrough, said apertures being positioned in an upper ⅓ portion of said cylinder;
   a pair of end caps being detachably coupled to said ends of said cylinder; and
   wherein said open ends of said cylinder are outwardly threaded, said pair of end caps being threadedly coupled to said ends of said cylinder.

2. The food smoker of claim 1, wherein the length of said cylinder between said ends is between about 6 and 24 inches long.

3. The food smoker of claim 1, wherein the outer diameter of said cylinder is between about ¾ and 3 inches.

4. The food smoker of claim 1, wherein said plurality of apertures are arranged in four spaced apart generally straight rows extending between said ends of said cylinder.

5. The food smoker of claim 4, wherein the distance between said rows is substantially uniform along the respective lengths.

6. The food smoker of claim 5, wherein the distance between the rows is between about ¹⁄₁₆ inch and ½ inch.

7. The food smoker of claim 6, wherein adjacent apertures in each of said rows are spaced apart at substantially equal intervals, the intervals between said apertures in each of said rows being substantially equal to the intervals between said apertures in the other rows.

8. The food smoker of claim 7, wherein the distance between the apertures in each particular row is between about ¼ and ¾ inch.

9. A food smoker for providing a smoky flavor to food, comprising:
   an elongate cylinder having opposed open ends, said cylinder having an interior adapted for receiving wood chips;
   said cylinder having a plurality of apertures extending therethrough, said apertures being positioned in an upper ⅓ portion of said cylinder;
   a pair of end caps being detachably coupled to said ends of said cylinder; and
   wherein each of said end caps has an arcuate hanging loop pivotally coupled thereto for suspending said cylinder above a heat source of said grill.

10. The food smoker of claim 9, wherein each of said end caps has a pair of opposed apertures extending inwardly of an outer periphery thereof, each of said hanging loops having opposed L-shaped ends being inserted in said apertures of said end caps.

11. The food smoker of claim 9, wherein each of said hanging loops of said end caps has a hook coupled thereto, said hooks being adapted to hook onto grate of a grill.

12. The food smoker of claim 9, wherein the length of said cylinder between said ends is between about 6 and 24 inches long.

13. The food smoker of claim 12, wherein the outer diameter of said cylinder is between about ¾ and 3 inches.

14. The food smoker of claim 9, wherein said plurality of apertures are arranged in four spaced apart generally straight rows extending between said ends of said cylinder.

15. The food smoker of claim 14, wherein the distance between said rows is substantially uniform along the respective lengths.

16. The food smoker of claim 15, wherein the distance between the rows is between about ¹⁄₁₆ inch and ½ inch.

17. The food smoker of claim 16, wherein adjacent apertures in each of said rows are spaced apart at substantially equal intervals, the intervals between said apertures in each of said rows being substantially equal to the intervals between said apertures in the other rows.

18. The food smoker of claim 17, wherein the distance between the apertures in each particular row is between about ¼ and ¾ inch.

19. A food smoking system for providing a smoky flavor to food comprising, in combination:
   a grill comprising a lower housing for holding flammable material therein, a grate being disposed on said lower housing, and a lid covering said housing, said lid having a pair of U-shaped hangers being downwardly extended therefrom;
   a plurality of wood chips;
   an elongate cylinder having opposed open ends, the length of said cylinder between said ends being between about 6 and 24 inches long, the outer diameter of said cylinder being between about ¾ and 3 inches, said cylinder having an interior for receiving wood chips;
   said cylinder having a plurality of apertures extending therethrough, said apertures being positioned in an upper ⅓ portion of said cylinder, said plurality of apertures being arranged in four spaced apart generally straight rows extending between said ends of said cylinder, the distance between said rows being substantially uniform along the respective lengths, wherein adjacent apertures in each of said rows are spaced apart at substantially equal intervals, the intervals between said apertures in each of said rows being substantially equal to the intervals between said apertures in the other rows, wherein the distance between the rows is between about ¹⁄₁₆ inch and ½ inch, wherein the distance between the apertures in each particular row is between about ¼ and ¾ inch;
   said open ends of said cylinder being outwardly threaded;
   a pair of threaded end caps being threadedly coupled to said ends of said cylinder;
   each of said end caps having an arcuate hanging loop pivotally coupled thereto for suspending said cylinder above a heat source of said grill;
   a line being extended between said hangers of said lid of said grill and said hanging loops of said end caps for suspending said cylinder from said lid, said cylinder being positioned above said grate; and
   each of said end caps having a pair of opposed apertures extending inwardly of an outer periphery thereof, each of said hanging loops having opposed L-shaped ends being inserted in said apertures of said end caps.

* * * * *